United States Patent
Gansen et al.

(10) Patent No.: US 9,758,021 B2
(45) Date of Patent: Sep. 12, 2017

(54) COMPOSITE PANE FOR A MOTOR VEHICLE AND MOTOR VEHICLE HAVING SUCH A COMPOSITE PANE

(71) Applicant: AUDI AG, Ingolstadt (DE)

(72) Inventors: Tobias Gansen, Pietenfeld (DE); Marcus Neudecker, Munich (DE); Daniel Pfaller, Wettstetten (DE)

(73) Assignee: AUDI AG, Ingolstadt (DE)

( * ) Notice: Subject to any disclaimer, the term of this patent is extended or adjusted under 35 U.S.C. 154(b) by 2 days.

(21) Appl. No.: 14/410,757

(22) PCT Filed: Jun. 12, 2013

(86) PCT No.: PCT/EP2013/001725
§ 371 (c)(1),
(2) Date: Dec. 23, 2014

(87) PCT Pub. No.: WO2013/189577
PCT Pub. Date: Dec. 27, 2013

(65) Prior Publication Data
US 2015/0151611 A1    Jun. 4, 2015

(30) Foreign Application Priority Data

Jun. 23, 2012   (DE) .................. 10 2012 012 566

(51) Int. Cl.
*B60J 1/00*    (2006.01)
*B60J 1/02*    (2006.01)
(Continued)

(52) U.S. Cl.
CPC ......... *B60J 1/001* (2013.01); *B32B 17/10036* (2013.01); *B32B 17/10183* (2013.01);
(Continued)

(58) Field of Classification Search
None
See application file for complete search history.

(56) References Cited

U.S. PATENT DOCUMENTS 2,628,927 A * 2/1953 Colbert ............ B32B 17/10018
156/106
2,676,117 A * 4/1954 Colbert ............ B32B 17/10018
219/543
(Continued)

FOREIGN PATENT DOCUMENTS

CN    201387618 Y  *  1/2010
CN    101833680 A  *  9/2010
(Continued)

OTHER PUBLICATIONS

Shandle, Unlicensed 915-MHz Band Fits Many Applications and Allows Higher Transmit Power, May 2011.*
(Continued)

*Primary Examiner* — Jeff Vonch
(74) *Attorney, Agent, or Firm* — Staas & Halsey LLP

(57) ABSTRACT

A composite pane for a motor vehicle, in particular the front pane, is formed from a first pane and a second pane, which are adhered to one another by way of a film. A coating reflecting infrared rays is applied to the film. The coating has at least one cut-out, within which a transponder is arranged between the two panes. A motor vehicle has a composite pane as described above.

15 Claims, 1 Drawing Sheet

(51) Int. Cl.
*B60J 1/20* (2006.01)
*B32B 3/24* (2006.01)
*B32B 17/06* (2006.01)
*B32B 17/10* (2006.01)
*H01Q 1/22* (2006.01)
*H01Q 1/32* (2006.01)
*H01Q 1/12* (2006.01)
*G02B 5/08* (2006.01)
*H04B 7/00* (2006.01)
*B32B 3/26* (2006.01)

(52) U.S. Cl.
CPC .......... *B32B 17/10201* (2013.01); *B60J 1/02* (2013.01); *B60J 1/20* (2013.01); *G02B 5/0808* (2013.01); *H01Q 1/1271* (2013.01); *H01Q 1/2208* (2013.01); *H01Q 1/325* (2013.01); *B32B 3/266* (2013.01); *B32B 17/06* (2013.01); *B32B 17/10* (2013.01); *B32B 17/1055* (2013.01); *B32B 17/10449* (2013.01); *B32B 17/10935* (2013.01); *B32B 17/10981* (2013.01); *B32B 2250/04* (2013.01); *B32B 2307/30* (2013.01); *B32B 2307/412* (2013.01); *B32B 2519/02* (2013.01); *B32B 2605/006* (2013.01); *H04B 7/00* (2013.01); *Y10T 428/24331* (2015.01); *Y10T 428/24851* (2015.01); *Y10T 428/24868* (2015.01)

(56) References Cited

U.S. PATENT DOCUMENTS

| | | | | |
|---|---|---|---|---|
| 3,317,906 A | * | 5/1967 | Baldridge | B32B 17/10036 156/99 |
| 3,597,050 A | * | 8/1971 | Plumat | B32B 17/10018 359/580 |
| 5,005,020 A | * | 4/1991 | Ogawa | B32B 17/10 343/713 |
| 5,620,799 A | * | 4/1997 | Sauer | B32B 17/10036 359/270 |
| 5,648,785 A | * | 7/1997 | Nagy | B32B 17/10036 343/713 |
| 5,760,744 A | * | 6/1998 | Sauer | B32B 17/10036 29/600 |
| 5,898,407 A | * | 4/1999 | Paulus | B32B 17/10 343/713 |
| 5,902,437 A | * | 5/1999 | McDonough | G06K 19/0776 156/234 |
| 6,121,880 A | * | 9/2000 | Scott | B32B 17/06 340/10.1 |
| 6,275,157 B1 | * | 8/2001 | Mays | B32B 17/06 340/572.5 |
| 6,313,796 B1 | * | 11/2001 | Potin | B32B 17/10036 343/700 MS |
| 6,339,384 B1 | * | 1/2002 | Valdes-Rodriguez | G08G 1/0175 235/384 |
| 6,352,754 B1 | * | 3/2002 | Frost | B32B 17/10 428/138 |
| 6,356,236 B1 | * | 3/2002 | Maeuser | B32B 17/10 343/713 |
| 6,366,220 B1 | | 4/2002 | Elliott | |
| 6,495,261 B1 | * | 12/2002 | Gagliardi | B32B 17/10018 296/190.1 |
| 6,559,419 B1 | * | 5/2003 | Sol | B32B 17/10192 219/203 |
| 6,765,177 B2 | * | 7/2004 | Noguchi | B32B 17/10036 219/203 |
| 6,787,005 B2 | * | 9/2004 | Laird | B32B 17/10036 204/192.22 |
| 6,926,786 B2 | * | 8/2005 | Frost | B32B 17/10 156/101 |
| 6,999,028 B2 | * | 2/2006 | Egbert | G06K 19/07749 343/700 MS |
| 7,019,260 B1 | * | 3/2006 | Degand | B32B 17/10036 219/203 |
| 7,034,326 B2 | * | 4/2006 | Noguchi | B32B 17/10036 219/203 |
| 7,125,462 B2 | * | 10/2006 | Disteldorf | C03C 17/36 156/101 |
| 7,379,028 B2 | * | 5/2008 | Hisaeda | H01Q 1/1271 219/203 |
| 7,557,715 B1 | * | 7/2009 | Noakes | G06K 19/07381 340/572.1 |
| 7,612,676 B2 | * | 11/2009 | Yuen | G06K 19/07749 340/572.1 |
| 7,642,918 B2 | * | 1/2010 | Kippelen | G06K 19/0723 340/10.1 |
| 8,546,729 B2 | * | 10/2013 | Derda | B32B 17/10 174/110 R |
| 8,810,462 B2 | * | 8/2014 | Goldberger | B32B 17/10036 156/102 |
| 9,050,779 B2 | * | 6/2015 | Derda | B32B 17/10 |
| 2002/0039649 A1 | * | 4/2002 | Nagai | B32B 17/10036 428/328 |
| 2002/0068167 A1 | * | 6/2002 | Veerasamy | C23C 14/0052 428/341 |
| 2002/0094407 A1 | | 7/2002 | Frost et al. | |
| 2003/0113551 A1 | * | 6/2003 | Thomsen | B32B 17/10036 428/435 |
| 2003/0232197 A1 | * | 12/2003 | Disteldorf | C03C 17/36 428/411.1 |
| 2004/0026397 A1 | * | 2/2004 | Degand | B32B 17/10 219/203 |
| 2004/0200821 A1 | * | 10/2004 | Voeltzel | B32B 17/10036 219/203 |
| 2005/0195115 A1 | * | 9/2005 | Yegin | B32B 17/10036 343/713 |
| 2006/0010795 A1 | | 1/2006 | Ohara et al. | |
| 2006/0156652 A1 | * | 7/2006 | Roquiny | B32B 17/10165 52/204.5 |
| 2006/0208904 A1 | * | 9/2006 | Ohara | B32B 17/10036 340/572.8 |
| 2006/0208905 A1 | * | 9/2006 | Ohara | B32B 17/10036 340/572.8 |
| 2006/0208906 A1 | * | 9/2006 | Kokuryo | B32B 17/10036 340/572.8 |
| 2006/0208907 A1 | * | 9/2006 | Kokuryo | B32B 17/10036 340/572.8 |
| 2006/0250711 A1 | * | 11/2006 | Noguchi | B32B 17/10036 359/883 |
| 2007/0052522 A1 | * | 3/2007 | Kokuryo | B60J 1/02 340/10.1 |
| 2007/0090092 A1 | * | 4/2007 | Forstner | B08B 7/0035 216/67 |
| 2007/0187382 A1 | * | 8/2007 | Mauser | B32B 17/10036 219/203 |
| 2008/0068180 A1 | | 3/2008 | Powell et al. | |
| 2008/0129511 A1 | * | 6/2008 | Yuen | G06K 19/07749 340/572.7 |
| 2009/0128431 A1 | * | 5/2009 | Martin | B32B 17/10036 343/713 |
| 2009/0212397 A1 | * | 8/2009 | Tuttle | H01L 27/1464 257/618 |
| 2010/0007469 A1 | * | 1/2010 | Cardullo | H04Q 9/00 340/10.1 |
| 2010/0068532 A1 | * | 3/2010 | Fisher | B32B 17/10018 428/426 |
| 2010/0085261 A1 | * | 4/2010 | Baranski | B32B 17/10018 343/713 |
| 2010/0165436 A1 | * | 7/2010 | Voss | B32B 17/10 359/238 |
| 2010/0255238 A1 | * | 10/2010 | Derda | B32B 17/10 428/38 |
| 2010/0265041 A1 | * | 10/2010 | Almog | G06K 19/07749 340/10.1 |
| 2010/0266832 A1 | * | 10/2010 | Derda | B32B 17/10 428/292.1 |
| 2011/0027515 A1 | * | 2/2011 | Melcher | B32B 17/10036 428/63 |

(56) References Cited

U.S. PATENT DOCUMENTS

| | | | |
|---|---|---|---|
| 2011/0074643 A1* | 3/2011 | Baranski | B32B 17/10036 343/712 |
| 2011/0114735 A1* | 5/2011 | Ziai | G06K 19/07786 235/492 |
| 2011/0169705 A1* | 7/2011 | Goldberger | B32B 17/10036 343/713 |
| 2011/0199674 A1* | 8/2011 | Melcher | B32B 17/10036 359/359 |
| 2012/0055998 A1* | 3/2012 | Mieslinger | G06K 19/07749 235/492 |
| 2012/0056002 A1* | 3/2012 | Ritamaki | G06K 19/07786 235/492 |
| 2012/0098715 A1* | 4/2012 | Dai | H01Q 1/1278 343/712 |
| 2013/0260139 A1* | 10/2013 | Kamada | C03C 17/007 428/328 |
| 2013/0300146 A1* | 11/2013 | Ogawa | B60J 1/02 296/84.1 |
| 2013/0301118 A1* | 11/2013 | Ogawa | B60J 1/02 359/350 |
| 2014/0015716 A1* | 1/2014 | Villarroel | H01Q 1/1271 343/713 |
| 2014/0266931 A1* | 9/2014 | Shkembi | H01Q 1/3291 343/712 |
| 2014/0332598 A1* | 11/2014 | Liu | H01Q 1/2225 235/492 |
| 2015/0013884 A1* | 1/2015 | Yeh | B23K 26/123 156/164 |

FOREIGN PATENT DOCUMENTS

| | | | |
|---|---|---|---|
| DE | 10019782 | 10/2001 | |
| DE | 102004016517 | 10/2005 | |
| DE | 102009025886 | 12/2010 | |
| DE | 102010004443 A1 * | 7/2011 | B60J 1/02 |
| DE | 202009018503 | 1/2012 | |
| DE | 102012012566 | 6/2012 | |
| EP | 1698454 | 9/2006 | |
| EP | 1759901 | 3/2007 | |
| EP | 1867508 A2 * | 12/2007 | B60J 1/02 |
| EP | 2325002 A1 * | 5/2011 | B32B 17/10 |
| GB | 2227589 | 8/1990 | |
| KR | 2009026592 A * | 3/2009 | |
| WO | WO 2006078147 A1 * | 7/2006 | G06K 19/07749 |
| WO | 2013/001725 | 6/2013 | |

OTHER PUBLICATIONS

German Office Action for German Priority Patent Application No. 10 2012 012 566.6, dated Jan. 21, 2013, 4 pages.

German Office Action for German Priority Patent Application No. 10 2012 012 566.6, dated Apr. 24, 2013, 5 pages.

German Office Action for German Priority Patent Application No. 10 2012 012 566.6, dated Aug. 2, 2013, 7 pages.

WIPO English Language Translation of Written Opinion for PCT/EP2013/001725, downloaded from WIPO Website dated Dec. 23, 2014, 7 pages.

English Language International Search Report for PCT/EP2013/001725, dated Sep. 20, 2013, 3 pages.

* cited by examiner

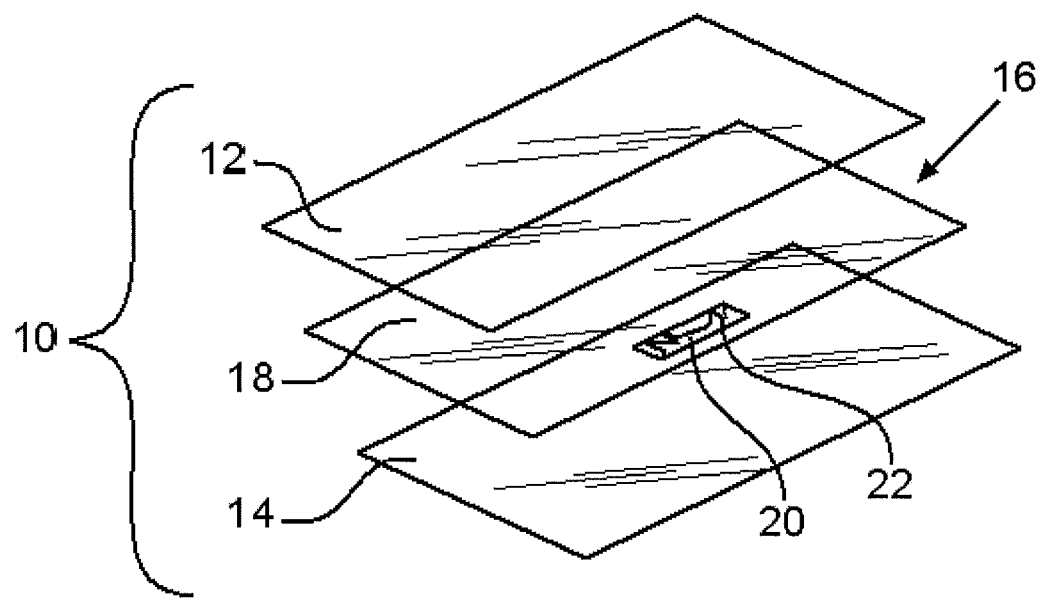

COMPOSITE PANE FOR A MOTOR VEHICLE AND MOTOR VEHICLE HAVING SUCH A COMPOSITE PANE

CROSS REFERENCE TO RELATED APPLICATIONS

This application is based on and hereby claims priority to International Application No. PCT/EP2013/001725 filed on Jun. 12, 2013 and German Application No. 10 2012 012 566.6 filed on Jun. 23, 2012, the contents of which are hereby incorporated by reference.

BACKGROUND

The invention relates to a composite pane for a motor vehicle. Furthermore, the invention relates to a motor vehicle having such a composite pane.

EP 175 901 A2 shows such a composite pane for a motor vehicle, comprising a first pane and a second pane, which are adhesively bonded to each other by a film. In this case, a transponder is arranged on the inside of the composite pane.

Furthermore, US 2008 00 681 80 A1 shows a windshield, within which there is formed a slot, in which an RFID transponder is arranged.

DE 100 19 782 A1 shows a windshield for a motor vehicle, on the inside of which a sensor, for example a light or rain sensor, is fitted in the central upper part of the windshield. Here, the sensor is arranged behind the windshield and, for example, placed behind a fixing device for the interior mirror. Partial coating of the windshield is carried out in the area where a light-sensitive sensor surface is located lying directly behind the windshield.

Finally, U.S. Pat. No. 6,366,220 B1 likewise shows a windshield for a motor vehicle, on the inside of which an RFID transponder is fitted.

Depending on the embodiment or material composition of the film by which the first and second pane of the composite pane are adhesively bonded to each other, it is possible for stoppage or disruption to occur to radio waves which are transmitted and/or received by a transponder fitted to the composite pane.

SUMMARY

One potential object is to provide a composite pane for a motor vehicle and a motor vehicle having such a composite pane, by which improved data transmission of a transponder fitted to the composite pane is made possible.

The inventors propose a composite pane for a motor vehicle, in particular the front pane, comprises a first pane and a second pane, which are adhesively bonded to each other by a film, wherein the proposed composite pane is distinguished by the fact that a coating reflecting infrared rays is applied to the film, said coating having at least one cut-out, within which a transponder is arranged between the two panes. This ensures that the transponder provided in the cut-out is able to transmit and receive data without disruption since, because of the cut-out, no disruptive influences are exerted on the transponder by the film. Furthermore, as a result of its arrangement between the two panes, the transponder is particularly well protected and can, for example, be protected against unintentional damage or theft.

According to an advantageous refinement, provision is made for the transponder to be an RFID transponder. Here, the transponder is preferably designed to transmit and to receive data at a frequency of 868 MHz. In other words, the transponder is an ultrahigh frequency transponder. As opposed to low or high frequency transponders, such an ultrahigh frequency transponder has a substantially higher range. In the case of low frequency transponders, the typical range is only a few millimeters up to a meter, in high frequency transponders the typical range being up to 3 m. In the case of an ultrahigh frequency transponder, on the other hand, typical ranges of up to 9 m are achieved. Furthermore, an ultrahigh frequency transponder has a substantially faster reading speed than low frequency or high frequency transponders.

In a further advantageous embodiment, the coating reflecting infrared rays is vapor-deposited onto the film. As a result, the coating reflecting infrared rays can be applied particularly economically to the film with high quality.

According to a further advantageous embodiment, provision is made for the coating reflecting infrared rays to be a metal oxide coating, wherein the coating reflecting infrared rays is preferably a silver oxide coating. As a result, particularly good reflection of UV rays is ensured, so that a vehicle interior can be protected against excessive heating as a result of solar irradiation.

In a further refinement, provision is made for the panes to be formed from glass.

The inventors also propose a motor vehicle having the proposed composite pane or advantageous embodiments of the composite pane.

BRIEF DESCRIPTION OF THE DRAWINGS

These and other objects and advantages of the present invention will become more apparent and more readily appreciated from the following description of the preferred embodiments, taken in conjunction with the accompanying drawing of which:

The drawing shows, in the single FIGURE, a composite pane for a motor vehicle in a partially transparent exploded illustration.

DETAILED DESCRIPTION OF THE PREFERRED EMBODIMENT

Reference will now be made in detail to the preferred embodiments of the present invention, examples of which are illustrated in the accompanying drawing.

A composite pane 10 for a motor vehicle comprises a first pane 12 and a second pane 14, which are adhesively bonded to each other by a film 16. In the present case, the composite pane 10 is a front pane for a motor vehicle; the composite pane 10 can also be used for further other panes of a motor vehicle. Here, the panes 12, 14 are formed from glass.

A coating 18 reflecting infrared rays is applied to the film 16. Here, the coating 18 reflecting infrared rays is vapor-deposited onto the film 16; in the present case, the coating reflecting infrared rays is a silver oxide coating. However, it can equally well be another metal oxide coating. By the coating 18 reflecting infrared rays, excessively intense heating of a vehicle interior is prevented, since a corresponding part of the infrared rays impinging on the composite pane 10 during the solar irradiation are reflected.

Provided within the coating 18 reflecting infrared rays is a cut-out 20, within which a transponder 22 is arranged between the two panes 12, 14. Alternatively, the transponder 22 can also be arranged on the side of the composite pane 10 that faces the inside of the vehicle, not specifically designated here, in the area of the cut-out 20. In the present case, the transponder 22 is an RFID transponder, which is designed to transmit and to receive data at a frequency of 868 MHz. In other words, the transponder 22 is an ultrahigh frequency transponder. This transmission frequency of 868 MHz is provided in the event of a use within the EU. The transponder 22 can also have another operating frequency range, for example should a use in the USA be envisaged, the transmitting and receiving frequency range is 915 MHz.

If the cut-out 20 were not present, the coating 18 reflecting infrared rays would considerably impair the transmission and reception of radio signals or data by the transponder 22. However, the fact that the transponder 22 is provided within the cut-out 20 ensures simply that the transponder 22 is able to communicate with one or more readers, not illustrated. It is thus ensured that, as soon as the transponder 22 and the composite pane 10 come into the vicinity of an appropriate reader, the transponder 22 is activated by a field from the reader. The transponder 22 subsequently transmits data correspondingly to be transmitted to the reader, which can then evaluate said data. For example, the transponder 22 can be used for the purpose of being employed in a system for cash-less payment, for example in filling stations or the like.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A composite pane for a front pane of a motor vehicle, comprising:
    a first pane;
    a second pane;
    a first layer disposed between the first and second panes, the first layer including a film to adhesively bond the first and second panes to each other;
    a second layer disposed between one of the first and second panes and at least a portion of the first layer, the second layer including a coating applied to the film to reflect infrared rays, the coating having a cut-out in a portion thereof such that the cut-out is circumferentially surrounded by the coating; and
    a transponder arranged in the second layer and in the cut-out in the portion of the coating such that the transponder is circumferentially surrounded by the coating,
    wherein
    the cut-out is arranged in only the coating, and the transponder is arranged in only the cut-out in the portion of the coating so that a thickness of the transponder is the same as or less than a thickness of the coating.

2. The composite pane as claimed in claim 1, wherein the film is not disposed between the one of the first and second panes and the transponder, so that the transponder, which is arranged in the second layer and in the cut-out in the portion of the coating, emits data through the one of the first and second panes without disruption by the film.

3. The composite pane as claimed in claim 1, wherein the transponder is a radio frequency identification (RFID) transponder.

4. The composite pane as claimed in claim 3, wherein the transponder is an ultra-high frequency RFID transponder.

5. The composite pane as claimed in claim 1, wherein the transponder transmits and receives data at a frequency of 868 MHz.

6. The composite pane as claimed in claim 1, wherein the transponder transmits and receives data at a frequency of 915 MHz.

7. The composite pane as claimed in claim 1, wherein the coating is vapor-deposited onto the film.

8. The composite pane as claimed in claim 1, wherein the coating is a metal oxide coating.

9. The composite pane as claimed in claim 1, wherein the coating is a silver oxide coating.

10. The composite pane as claimed in claim 1, wherein the first and second panes are formed from glass.

11. The composite pane as claimed in claim 3, wherein the transponder transmits and receives data at a frequency of 915 MHz.

12. The composite pane as claimed in claim 11, wherein the coating is vapor-deposited onto the film.

13. The composite pane as claimed in claim 12, wherein the coating is a silver oxide coating.

14. The composite pane as claimed in claim 13, wherein the first and second panes are formed from glass.

15. A motor vehicle comprising:
    a front window formed of a composite pane, the composite pane comprising:
        a first pane;
        a second pane;
        a first layer disposed between the first and second panes, the first layer including a film to adhesively bond the first and second panes to each other;
        a second layer disposed between one of the first and second panes and at least a portion of the first layer, the second layer including a coating applied to the film to reflect infrared rays, the coating having a cut-out in a portion thereof such that the cut-out is circumferentially surrounded by the coating; and
        a transponder arranged in the second layer and in the cut-out in the portion of the coating such that the transponder is circumferentially surrounded by the coating,
    wherein
    the cut-out is arranged in only the coating, and the transponder is arranged in only the cut-out in the portion of the coating so that a thickness of the transponder is the same as or less than a thickness of the coating.

\* \* \* \* \*